(12) United States Patent
Chen et al.

(10) Patent No.: US 11,902,933 B2
(45) Date of Patent: Feb. 13, 2024

(54) POSITIONING METHOD AND APPARATUS BASED ON BINARY PERIODIC SEQUENCE

(71) Applicant: ZTE CORPORATION, Guangdong (CN)

(72) Inventors: Shijun Chen, Guangdong (CN); Dawei Chen, Guangdong (CN); Lingfei Jin, Guangdong (CN); Luyan Qian, Guangdong (CN); Jiaming Teng, Guangdong (CN)

(73) Assignee: ZTE CORPORATION, Guangdong (CN)

(*) Notice: Subject to any disclaimer, the term of this patent is extended or adjusted under 35 U.S.C. 154(b) by 79 days.

(21) Appl. No.: 17/611,135

(22) PCT Filed: May 11, 2020

(86) PCT No.: PCT/CN2020/089598
§ 371 (c)(1),
(2) Date: Nov. 13, 2021

(87) PCT Pub. No.: WO2020/228677
PCT Pub. Date: Nov. 19, 2020

(65) Prior Publication Data
US 2022/0232512 A1    Jul. 21, 2022

(30) Foreign Application Priority Data
May 13, 2019 (CN) .......... 201910395480.9

(51) Int. Cl.
*H04W 64/00* (2009.01)
*G01S 5/02* (2010.01)
*H04L 5/00* (2006.01)

(52) U.S. Cl.
CPC ........ *H04W 64/003* (2013.01); *G01S 5/0284* (2013.01); *H04L 5/0048* (2013.01)

(58) Field of Classification Search
None
See application file for complete search history.

(56) References Cited

U.S. PATENT DOCUMENTS

| 8,200,616 B2 | 6/2012 | Boldyrev et al. |
| 2014/0050076 A1* | 2/2014 | Popovic ............ H04W 74/0833 370/208 |

(Continued)

FOREIGN PATENT DOCUMENTS

| CN | 102272728 A | 12/2011 |
| CN | 111083629 A | 4/2020 |

OTHER PUBLICATIONS

WIPO, International Search Report dated Jul. 27, 2020.
(Continued)

*Primary Examiner* — Adolf Dsouza
(74) *Attorney, Agent, or Firm* — Li & Cai Intellectual Property (USA) Office

(57) ABSTRACT

A positioning method based on a binary periodic sequence includes: selecting one polynomial from each equivalence class of a quadratic polynomial set S to determine a set T; constructing a binary periodic sequence cluster according to the set T; generating a positioning signal according to the binary periodic sequence cluster; and performing positioning processing according to the positioning signal.

20 Claims, 8 Drawing Sheets

(56) References Cited

U.S. PATENT DOCUMENTS

2015/0078150 A1* 3/2015 Moreno De Ayala .. H04J 13/12
370/208
2016/0105223 A1* 4/2016 Baek .................... H04L 1/0041
375/267

OTHER PUBLICATIONS

ZTE, Fudan University. "New sequence for NR PRS," 3GPP TSG RAN WG1 #97, Reno, USA, May 13, 2019.
Intel Corporation, Ericsson. "NR Positioning Support," 3GPP TSG RAN Meeting #83, Shenzhen, China, Mar. 21, 2019.
CATT. "NR Positioning Reference Signals for OTDOA," 3GPP TSG RAN WG1 Meeting #95, Spokane, USA, Nov. 16, 2018.
Intel Corporation. "Downlink and Uplink Reference Signals for NR Positioning," 3GPP TSG RAN WG1 Meeting #96bis, Xi'an, China, Apr. 12, 2019.

* cited by examiner

POSITIONING METHOD AND APPARATUS BASED ON BINARY PERIODIC SEQUENCE

CROSS-REFERENCE TO RELATED APPLICATIONS

The present disclosure claims priority from the Chinese patent application No. 201910395480.9 filed with the China Patent Office on May 13, 2019, the entire contents of which are incorporated in the present disclosure by reference.

TECHNICAL FIELD

The present application relates to the field of communications, and in particular to a positioning method and apparatus based on a binary periodic sequence.

BACKGROUND

The binary sequence has been widely used in the engineering field, especially in wireless communications and navigation positioning.

Let $F_q$ be a finite field of q elements, and let q be a prime power (power of a prime number). A set of all nonzero elements in $F_q$ is denoted as $F_q^*$. Let F be a set of binary sequences, each binary sequence having a length of n. Then, for each sequence $s=(s_0, s_1, \ldots, s_{n-1}) \in F$, where $s_i \in \{1,-1\}$, it is defined that an auto-correlation coefficient of s at delay $t(1 \le t \le n-1)$ is:

$$A_t(s) := \sum_{i=0}^{n-1} s_i s_{i+t}$$

where $i+t=(i+t)$ mod n. Then, for two different sequences $u=(u_0, u_q, \ldots, u_{n-1})$ and $v=(v_0, v_1, \ldots, v_{n-1}) \in F$, $u_i, v_j \in \{1,-1\}$, define a cross-correlation coefficient of u and v at delay $t(1 \le t \le n-1)$ as:

$$C_t(u, v) := \sum_{i=0}^{n-1} u_i v_{i+t}$$

The correlation of a sequence cluster $\mathcal{F}$ is defined as:

$$\mathrm{Cor}(\mathcal{F}) := \max\left\{\max_{s \in \mathcal{F}, 1 \le t \le n-1}\{A_t(s)\}, \max_{u \ne v \in \mathcal{F}, 0 \le t \le n-1}\{C_t(u, v)\}\right\}$$

Among the known sequences, the Gold sequence is widely applied due to better correlation. The Gold sequence is a pseudo-random sequence with good characteristics. There are various methods for constructing the Gold sequence. One of the typical construction methods is to make use of a trace function. Let $q=2^n$ and let $\gamma$ be a generator of $F_q^*$. Then the Gold sequence may be represented by:

$$\left\{(-1)^{Tr(a+b)}, (-1)^{Tr(a\gamma+b\gamma^3)}, \ldots, (-1)^{Tr(a\gamma^{q-2}+b\gamma^{(q-2)^3})} \,\middle|\, a, b, \in F_q\right\};$$

where Tr is the trace function from $F_q$ to $F_2$. Since the correlation of the Gold sequence depends on rational points on a curve $y^2+y=c^3+dx$, the correlation of the Gold sequence may be estimated with a Hasse-Weil bound.

However, no solution has been proposed yet for the following problem in the related art: although the constructed binary sequence has a good correlation mean value, the peak of correlation coefficient of the positioning signal generated in the positioning application is large.

SUMMARY

Embodiments of the present disclosure provide a positioning method and apparatus based on a binary periodic sequence to solve at least the following problem in the related art: although the constructed binary sequence has a good correlation mean value, the peak of correlation coefficient of the positioning signal generated in the positioning application is large.

According to an embodiment of the disclosure, there is provided a positioning method based on a binary periodic sequence, including: selecting one polynomial from each equivalence class of a quadratic polynomial set (set of quadratic polynomials) S to determine a set T; constructing a binary periodic sequence cluster according to the set T; generating a positioning signal according to the binary periodic sequence cluster; and performing positioning processing according to the positioning signal.

According to another aspect of the embodiment of the present disclosure, there is further provided a positioning apparatus based on a binary periodic sequence, including: a first selection module configured to select one polynomial from each equivalence class of a quadratic polynomial set S to determine a set T; a construction module configured to construct a binary periodic sequence cluster according to the set T; a generating module configured to generate a positioning signal according to the binary periodic sequence cluster; and a positioning processing module configured to perform positioning processing according to the positioning signal.

According to still another embodiment of the disclosure, there is further provided a storage medium having a computer program stored thereon, wherein the computer program is configured to be executed to cause steps of any one of the above method embodiments to be implemented.

According to still another embodiment of the disclosure, there is further provided an electronic apparatus, including a memory and a processor, wherein the memory has a computer program stored thereon, and the processor is configured to execute the computer program to implement steps of any of the method embodiments as described above.

According to the present disclosure, a polynomial determination set T is selected from each equivalence class of a quadratic polynomial set S; a binary periodic sequence cluster is constructed according to the set T; a positioning signal is generated according to the binary periodic sequence cluster; and positioning processing is performed according to the positioning signal, thereby solving the following problem in the related art: although the constructed binary sequence has a good correlation mean value, the peak of correlation coefficient of the positioning signal generated in the positioning application is large. Since the constructed binary sequence with a new length has good correlation coefficient, the peak of positioning correlation coefficient generated in the positioning application is relatively small.

BRIEF DESCRIPTION OF DRAWINGS

The drawings described herein are intended to provide a further understanding of the present disclosure, and are intended to be a part of the present disclosure. The exemplary embodiments of the present disclosure and the description thereof are for explaining the present disclosure and do not constitute an undue limitation of the present disclosure. In the drawings.

DETAIL DESCRIPTION OF EMBODIMENTS

The disclosure will be described in detail below with reference to the drawings in conjunction with the embodiments. It should be noted that embodiments of the disclosure and features therein may be combined with each other in any manner as long as they are not contradictory.

It should be also noted that terms "first", "second", and the like in the description, claims and drawings of the disclosure are used for the purpose of distinguishing similar objects instead of indicating a specific order or sequence. In addition, sets $T_1, T_1', T_2, T_2'$ and the like are examples of the above set T, sets $S_1, S_1', S_2'$ and the like are examples of the above quadratic polynomial set S, and $\mathcal{F}_1, \mathcal{F}_1', \mathcal{F}_2, \mathcal{F}_2''$ and the like are examples of the above binary periodic sequence cluster.

Embodiment 1

Figure 1:
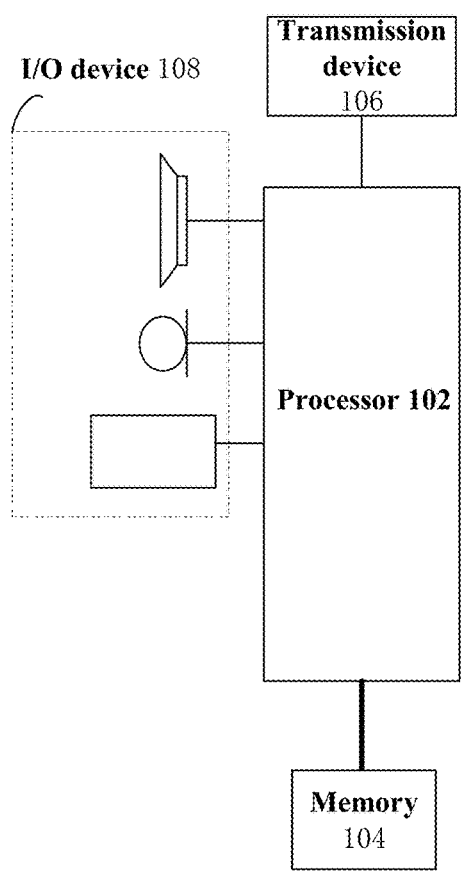
FIG. 1 is a block diagram showing a hardware structure of a mobile terminal used in a positioning method based on a binary periodic sequence according to an embodiment of the present disclosure.

The method embodiment provided in Embodiment 1 of the present disclosure may be implemented in a mobile terminal, a computer terminal or the like. Taking running on a mobile terminal as an example, FIG. 1 is a block diagram showing a hardware structure of a mobile terminal used in a positioning method based on a binary periodic sequence according to an embodiment of the present disclosure. As shown in FIG. 1, a mobile terminal 10 may include one or more (only one is shown in FIG. 1) processors 102 (which may include, but are not limited to, microprocessor units (MCUs), programmable logic devices such as FPGAs or other processing devices), and a memory 104 configured to store data. Optionally, the mobile terminal may further include a transmission device 106 for communication functions and an input/output device 108. It will be understood by those ordinary skilled in the art that the structure shown in FIG. 1 is merely illustrative, and does not form any limitation to the structure of the above mobile terminal. For example, the mobile terminal 10 may include more or fewer components than those shown in FIG. 1, or have a different configuration than that shown in FIG. 1.

The memory 104 may be configured to store a computer program, for example, a software program and a module of application software, such as a computer program corresponding to the positioning method based on a binary periodic sequence in the embodiments of the present disclosure, and the processor 102 executes the computer program stored in the memory 104 to perform various functional applications and data processing, that is, implement the above method. The memory 104 may include a high speed random access memory and may also include a non-volatile memory such as one or more magnetic storage device, flash memory, or other non-volatile solid state memory. In some examples, the memory 104 may further include a memory remotely located relative to the processor 102, which may be connected to the mobile terminal 10 via a network. Examples of such networks include, but are not limited to, the Internet, intranets, local area networks, mobile communication networks, and combinations thereof.

The transmission device 106 is configured to receive or transmit data via a network. Specific examples of such networks may include a wireless network provided by a communication provider of the mobile terminal 10. In an example, the transmission device 106 includes a Network Interface Controller (NIC) that may be connected to another network device through a base station to communicate with the Internet. In an example, the transmission device 106 may be a Radio Frequency (RF) module configured to communicate with the Internet wirelessly.

Figure 2:
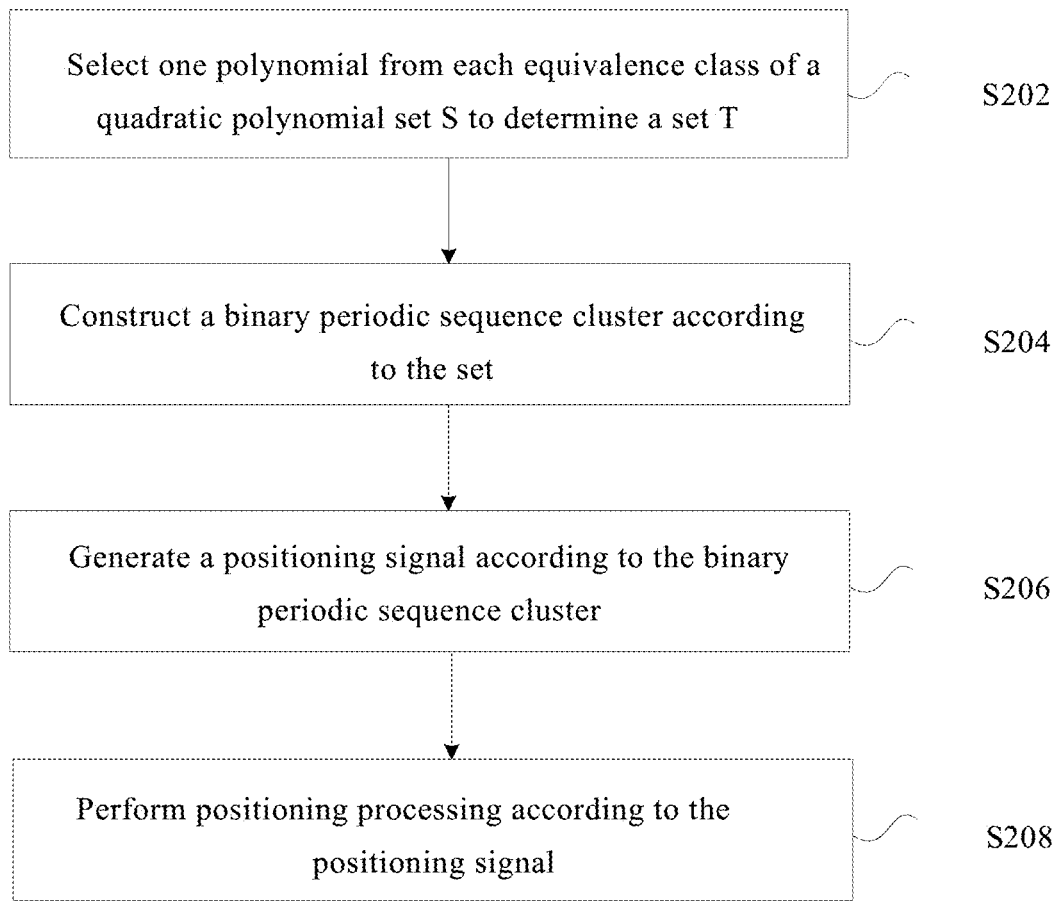
FIG. 2 is a flowchart of a positioning method based on a binary periodic sequence according to an embodiment of the present disclosure.

Based on the above mobile terminal, this embodiment provides a positioning method based on a binary periodic sequence. FIG. 2 is a flowchart of a positioning method based on a binary periodic sequence according to an embodiment of the present disclosure. As shown in FIG. 2, the flow includes steps S202 to S208.

At step S202, select one polynomial from each equivalence class of a quadratic polynomial set S to determine a set T.

In the above step S202, specifically, polynomials are selected from the respective equivalence classes of the quadratic polynomial set S, and the set T is determined according to the respective selected polynomials.

At step S204, construct a binary periodic sequence cluster according to the set T.

At step S206, generate a positioning signal according to the binary periodic sequence cluster.

At step S208, perform positioning processing according to the positioning signal.

Through the above steps S202 to S208, the following problem in the related art is solved: although the constructed binary sequence has a good correlation mean value, the peak of correlation coefficient of the positioning signal generated in the positioning application is large. Since the constructed binary sequence with a new length has good correlation coefficient, the peak of positioning correlation coefficient generated in the positioning application is relatively small.

In an embodiment of the present disclosure, the above step S206 may specifically include:
- selecting a positioning sequence from the binary periodic sequence cluster according to a preset parameter;
- taking a truncated sequence with a preset length from the positioning sequence and determining the truncated sequence as a positioning reference sequence; and
- generating the positioning signal by modulating the positioning reference sequence.

In an embodiment of the present disclosure, the above step S208 may specifically include:
- mapping the positioning signal to an antenna port at a transmitting end for transmission. The positioning signal is configured to instruct a receiving end, after receiving the positioning signal, to: perform cross-correlation to obtain an arrival time of the positioning signal, determine a distance from the transmitting end according to the arrival time, and perform positioning (on the transmitting end) according to the distance.

In an embodiment of the present disclosure, before selecting one polynomial from each equivalence class of the quadratic polynomial set S to determine the set T, select one generator $\gamma$ from $F_q^*$, where $F_q$ is a finite field containing q elements, q is an odd prime or an odd prime power (i.e., a power of an odd prime number), and $F_q^*$ is a set of all nonzero elements in $F_q$.

In an embodiment, the above step S202 may specifically include:
- selecting one polynomial f(x) (i.e., $[x^2+ax+b]$) from each equivalence class of a quadratic polynomial set $S_1$, and combining the polynomial f(x) with x−1 to form a set $T_1$:

$$T_1 = \{x-1\} \cup \{x^2+ax+b \in S_1, [x^2+ax+b]$$

are equivalence classes distinct to each other}

$$\text{where } S_1 = \{x^2+ax+b, a \in F_q^*, b \in F_q\} \setminus \{(x-a)^2, a \in F_q^*\}.$$

In an embodiment of the present disclosure, the above step S204 may specifically include:
- constructing a binary periodic sequence cluster $\mathcal{F}_1$ from the generator $\gamma$ and the set $T_1$:

$$\mathcal{F}_1 = \{s_f, f(x) \in T_1\};$$

$$s_f = \{\eta(f(1)), \eta(f(\gamma)), \ldots, \eta(f(\gamma^{q-2}))\};$$

$$\eta(\alpha) = \begin{cases} 1, & \text{if } \alpha \text{ is a nonzero square} \\ -1, & \text{if } \alpha \text{ is a non-square} \\ 0, & \text{if } \alpha = 0 \end{cases}$$

where $\eta$ is a quadratic multiplicative character from $F_q$ to $C^*$, C is a complex number set excluding 0, and $\alpha$ is any element in $F_q^*$.

Optionally, each sequence in the binary periodic sequence cluster $F_1$ has a length of q−1;

the binary periodic sequence cluster $\mathcal{F}_1$ has a size of q; and if q≥17 and is an odd prime power, a correlation upper limit of the binary periodic sequence cluster $\mathcal{F}_1$ is $\text{Cor}(\mathcal{F}_1) \leq 6 + \lfloor 2\sqrt{q} \rfloor$.

Furthermore, the above step S202 may further specifically include:
- in the case where $x^2+ax+b$ in $S_1$ is an irreducible polynomial, $$S_1' = \{x^2+ax+b, a \in F_q^*, b \in F_q, x^2+ax+b \text{ is an irreducible polynomial}\};$$

selecting one polynomial f(x) from each equivalence class of a quadratic polynomial set $S_1'$, and combining the polynomial f(x) with x−1 to form a set $T_1'$:

$$T_1' = \{x-1\} \cup \{x^2+ax+b \in S_1', [x^2+ax+b]$$

are equivalence classes distinct to each other}

Correspondingly, the step S204 may specifically further include:
- constructing a binary periodic sequence cluster $\mathcal{F}_1'$ from the generator $\gamma$ and the set $T_1'$:

$$\mathcal{F}_1' = \{s_f, f(x) \in T_1'\};$$

$$s_f = \{\eta(f(1)), \eta(f(\gamma)), \ldots, \eta(f(\gamma^{q-2}))\};$$

$$\eta(\alpha) = \begin{cases} 1, & \text{if } \alpha \text{ is a nonzero square} \\ -1, & \text{if } \alpha \text{ is a non-square} \\ 0, & \text{if } \alpha = 0 \end{cases}$$

where $\eta$ is a quadratic multiplicative character from $F_q$ to $C^*$, C is a complex number set excluding 0, and $\alpha$ is any element in $F_q^*$.

Optionally, each sequence in the binary periodic sequence cluster $\mathcal{F}_1'$ has a length of q−1;

the binary periodic sequence cluster $\mathcal{F}_1'$ has a size of $\frac{1}{2}(q-1)$; and if q≥11 and is an odd prime power, a correlation coefficient upper limit of the binary periodic sequence cluster $\mathcal{F}_1'$ is $\text{Cor}(\mathcal{F}_1') \leq \lfloor 2\sqrt{q} \rfloor$.

In an embodiment of the present disclosure, before selecting one polynomial from each equivalence class of the quadratic polynomial set S to determine the set T, equivalence class division is performed on the polynomials in the quadratic polynomial set S, which includes:
- determining, if and only if there exists $\beta \in F_q^*$ such that $a_1=\beta a_2$, $b_1=\beta^2 b_2$, an equivalence relation between $x^2+a_1x+b_1$ and $x^2+a_2x+b_2$, and determining an equivalence class of the quadratic polynomial set S to be $[x^2+a_1x+b_1]$.

In another embodiment, the above step S202 may specifically include:
- selecting one polynomial f(x) from each equivalence class of a quadratic polynomial set $S_2$ and combining the polynomial f(x) with x to form a set $T_2$:

$$T_2 = \{x\} \cup \{x^2 + ax + b \in S_2, [x^2 + ax + b]$$

are equivalence classes distinct to each other$\}$;

$$S_2 = \{x^2 \, ax+b, \, a,b \in F_q\} \setminus \{(x-a)^2, \, a \in F_q\},$$

where $F_q$ is a finite field containing q elements, and q is an odd prime.

Correspondingly, the step S204 may specifically include: constructing a binary periodic sequence cluster $\mathcal{F}_2$ from the set $T_2$:

$$\mathcal{F}_2 = \{u_f, \, f(x) \in T_2\};$$

$$u_f = \{\eta(f(0)), \, \eta(f(1)), \, \ldots, \, \eta(f(q-1))\};$$

$$\eta(\alpha) = \begin{cases} 1, & \text{if } \alpha \text{ is a nonzero square} \\ -1, & \text{if } \alpha \text{ is a non-square} \\ 0, & \text{if } \alpha = 0 \end{cases}$$

where $\eta$ is a quadratic multiplicative character from $F_q$ to $C^*$, C is a complex number set excluding 0, and $\alpha$ is any element in $F_q^*$.

Optionally, each sequence in the binary periodic sequence cluster $\mathcal{F}_2$ has a length of q;

the binary periodic sequence cluster $\mathcal{F}_2$ has a size of q; and if q≥17 and is an odd prime, a correlation coefficient upper limit of the binary periodic sequence cluster $\mathcal{F}_2$ is $\text{Cor}(\mathcal{F}_2) \leq 5 + \lfloor 2\sqrt{q} \rfloor$.

In an embodiment, the above step S202 may further specifically include:

in the case where the $x^2+ax+b$ in $S_2$ is an irreducible polynomial, $$S_2' = \{x^2 + ax + b, \, a, b \in F_q, \, x^2 + ax + b \text{ is an irreducible polynomial}\};$$

selecting one polynomial f(x) from each equivalence class of a quadratic polynomial set $S_2'$ and combining the polynomial f(x) with x to form a set $T_2'$:

$$T_2' = \{x\} \cup \{x^2 + ax + b \in S_2', [x^2 + ax + b]$$

are equivalence classes distinct to each other$\}$.

Correspondingly, the step S204 may further include: constructing a binary periodic sequence cluster $\mathcal{F}_2'$ from the set $T_2'$ $$\mathcal{F}_2' = \{u_f, \, f(x) \in T_2'\};$$

$$u_f = \{\eta(f(0)), \, \eta(f(0)), \, \ldots, \, \eta(f(q-1))\};$$

$$\eta(\alpha) = \begin{cases} 1, & \text{if } \alpha \text{ is a nonzero square} \\ -1, & \text{if } \alpha \text{ is a non-square} \\ 0, & \text{if } \alpha = 0 \end{cases}$$

where $\eta$ is a quadratic multiplicative character from $F_q$ to $C^*$, C is a complex number set excluding 0, and $\alpha$ is any element in $F_q^*$.

Optionally, each sequence in the binary periodic sequence cluster $\mathcal{F}_2'$ has a length of q;

the binary periodic sequence cluster $\mathcal{F}_2'$ has a size of (q−1)/2; and if q≥7 and is an odd prime, a correlation coefficient upper limit of the binary periodic sequence cluster $\mathcal{F}_2'$ is $\text{Cor}(\mathcal{F}_4) \leq 1 + \lfloor 2\sqrt{q} \rfloor$.

In an embodiment of the present disclosure, before selecting one polynomial from each equivalence class of the quadratic polynomial set S to determine the set T, the step of performing equivalence class division on the polynomials in the quadratic polynomial set S, may include:

determining, if and only if there exists $\beta \in F_q$, $a_1 = 2\beta + a_2$, $b_1 = \beta^2 + \beta a + b_2$, an equivalence relation between $x^2 + a_1 x + b_1$ and $x^2 + a_2 x + b_2$, and determining an equivalence class of the quadratic polynomial set S to be $[x^2 + a_1 x + b_1]$.

An embodiment of the present disclosure provides a method for designing a binary periodic sequence based on prime characteristics, in which a length of the sequence may be an odd prime (or odd prime−1) or a prime power (or prime power −1), and has a better correlation coefficient. The binary periodic sequence is a special sequence, i.e., a periodic sequence that takes only two nonzero values.

Example 1

Based on a multiplicative group structure of a prime characteristic finite field, q is an odd prime or an odd prime power. Consider a monic quadratic polynomial set:

$$S_1 = \{x^2 + ax + b, \, a \in F_q^*, \, b \in F_q\} \setminus \{(x-a)^2, \, a \in F_q^*\};$$

the number of the sets is $q(q-1)-(q-1)=(q-1)^2$.

Define an equivalence relation in $S_1$: $x^2+a_1 x+b_1 \sim x^2+a_2 x+b_2$, if and only if there exists $\beta \in F_q^*$ such that $a_1 = \beta a_2$, $b_1 = \beta^2 b_2$, there are exactly q−1 elements in each equivalence class. Thus, there is exactly q−1 equivalence classes, denoted as $[x^2+a_1 x+b_1]$.

Select one polynomial in each equivalence class, and combine the selected polynomials with x−1 to form a set a set $T_1$:

$$T_1 = \{x-1\} \cup \{x^2 + ax + b \in S_1, [x^2 + ax + b]$$

are equivalence classes distinct to each other$\}$.

Generate the binary periodic sequence cluster $\mathcal{F}_1$ by:

selecting one generator $\gamma$ from $F_q^*$ so that the elements in $F_q$ are denoted as $\{\gamma^0, \gamma^1, \ldots, \gamma^{q-2}\}$ and select one polynomial from each equivalence class $[x^2+ax+b]$ of $S_1$.

For f(x) in each $T_1$, define:

$$s_f = \{\eta(f(1)), \, \eta(f(\gamma)), \, \ldots, \, \eta(f(\gamma^{q-2}))\};$$

the binary periodic sequence cluster $\mathcal{F}_1$ is: $\mathcal{F}_1 = \{s_f, \, f(x) \in T_1\}$, and furthermore, $$\mathcal{F}_1 = \{\eta(x^2 + ax + b) \mid x = \gamma^0, \gamma^1, \ldots, \gamma^{q-2}, [x^2 + ax + b] \in S_1\}.$$

Parameters of this sequence are listed below:
1. each sequence in the binary periodic sequence cluster $\mathcal{F}_1$ has a length of q−1;
2. $\mathcal{F}_1$ has a size of q; and
3. if q≥17 and is an odd prime power, a correlation upper limit of the binary periodic sequence cluster $\mathcal{F}_1$ is $\mathrm{Cor}(\mathcal{F}_1) \leq 6 + \lfloor 2\sqrt{q} \rfloor$.

The estimation of correlation of such sequences depends on rational points of the curve $y^2+y=\alpha(x^2+ax_b)(x^2+cx+d)$, a, b, c, d∈$F_q$. The correlation may also be estimated with a Hasse-Weil bound.

For example, a sequence 1 generated based on a multiplicative group is:

[1011000101010001110100100000011100000010111010010
0101000101101100010110111000110000011001010001101
1101111011000101001100000110001110110100011010
0101001001011101000000111000000100101110001010100
1101110110110011010010101100010101010110111001
101000111010001111101111100110100100011110111010
0010001001110111100010010110011111101111100010110
001011001110110101010100011010100101100110101101
1].

Figure 3:
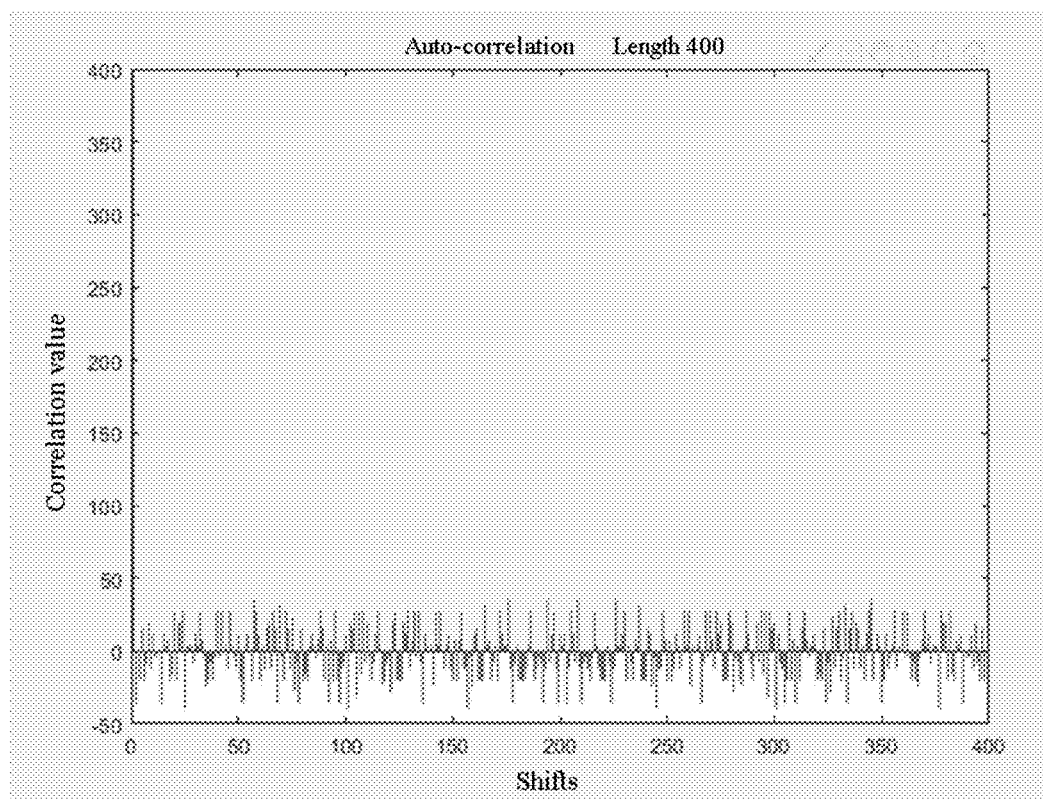
FIG. 3 is a schematic diagram showing auto-correlation values of a multiplicative group sequence 1 according to an embodiment of the present disclosure.

FIG. 3 is a schematic diagram showing auto-correlation values of a multiplicative group sequence 1 according to an embodiment of the present disclosure. Auto-correlation values of the sequence 1 are as shown in FIG. 3.

A sequence 2 generated based on a multiplicative group is:

[10101101011000001111110110011100101101110100011
00110101001110100010001000011100110110100111110000
11001010000010001000010010111111100010001110100110
00010101100011000011011011110001100101111101011011
010101011010111101001110011101101100001100011011
01000011001011100010011111110100100001000100000010
10011000011111001011011001110000100010010111001011
01100110000101110110100111100110111111100000110101
0].

Figure 4:
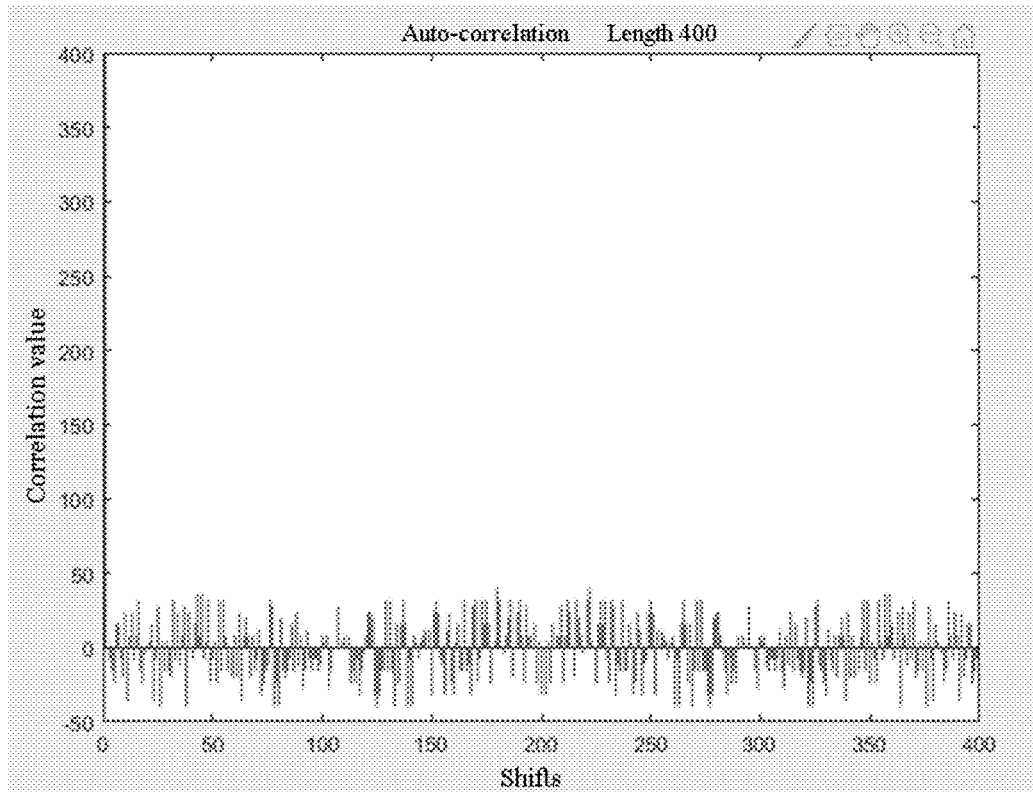
FIG. 4 is a schematic diagram showing auto-correlation values of a multiplicative group sequence 2 according to an embodiment of the present disclosure.

FIG. 4 is a schematic diagram showing auto-correlation values of a multiplicative group sequence 2 according to an embodiment of the present disclosure. Auto-correlation values of the sequence 2 are as shown in FIG. 4.

Figure 5:
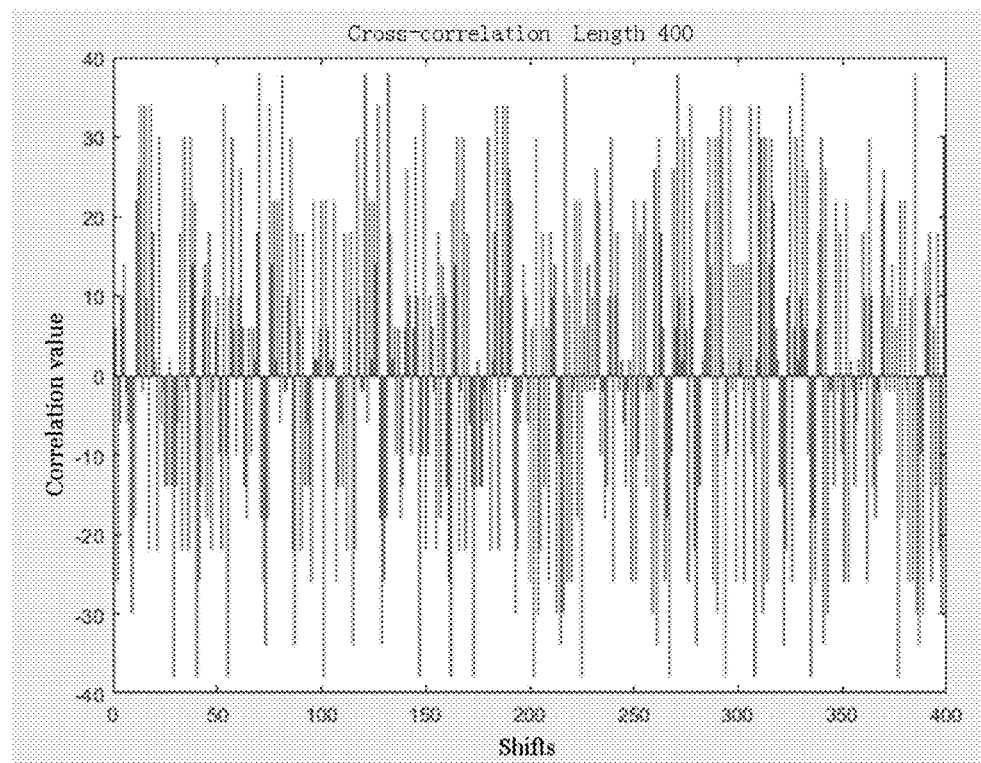
FIG. 5 is a schematic diagram showing cross-correlation values of a multiplicative group sequence according to an embodiment of the present disclosure.

FIG. 5 is a schematic diagram showing cross-correlation values of a multiplicative group sequence according to an embodiment of the present disclosure. Cross-correlation values of the sequences 1 and 2 generated based on multiplicative groups are as shown in FIG. 5.

Data simulation results of $\mathcal{F}_1$ are shown in table 1.

TABLE 1

| Prime number p | Sequence length | Sequence number | Correlation coefficient | Balance number |
|---|---|---|---|---|
| 31 | 30 | 30 | 14 | 16 |
| 67 | 66 | 66 | 20 | 34 |
| 127 | 126 | 126 | 24 | 64 |
| 257 | 256 | 256 | 34 | 128 |
| 521 | 520 | 520 | 48 | 260 |
| 1033 | 1032 | 1032 | 66 | 516 |

The above scheme considers all quadratic polynomials, but leads to the loss of the correlation coefficient. Preferably, only quadratic irreducible polynomials are considered:

$$S_1' = \{x^2 + ax + b, a \in F_q^*, b \in F_q, x^2 + ax + b \text{ is an irreducible polynomial}\}.$$

A cardinality of the set $S_1'$ is equal to ½q(q−1)−½(q−1) =½(q−1)².

Also, the equivalence class is defined according to the previous definition.

There are exactly q−1 elements in each equivalence class. As a result, there are exactly ½(q−1) equivalence classes.

Select one polynomial from each of the above equivalence classes to form a set $T_1'$, and obtain a set $\mathcal{F}_1'=\{s_f: f \in T_1'\}$;

$$T_1' = \{x-1\} \cup \{x^2 + ax + b. \in S_1', [x^2 + ax + b]$$

are equivalence classes distinct to each other}.

Generating the sequence cluster $\mathcal{F}_1'$ includes:
selecting one generator γ from $F_q^*$;
for f(x) in each $T_1'$, defining:

$$s_f = \{\eta(f(1)), \eta(f(\gamma)), \ldots, \eta(f(\gamma^{q-2}))\};$$

defining the sequence cluster as: $\mathcal{F}_1'=\{s_f, f(x) \in T_1'\}$.
Parameters of this sequence include:
1. each sequence in the binary periodic sequence cluster $\mathcal{F}_1'$ has a length of q−1;
2. $\mathcal{F}_1'$ has a size of ½(q−−1); and
3. if q≥11 and is an odd prime power, a correlation coefficient upper limit of $\mathcal{F}_1'$ is $\mathrm{Cor}(\mathcal{F}_1') \leq 2 + \lfloor 2\sqrt{q} \rfloor$.

For example, a sequence 1 generated based on a multiplicative group irreducible polynomial is:

[11011001000010001110100111100110011010001010110110
011001011000101100101010001110100111111010000011100
001101000110001000100011011000101111010110001110110
011001011010000011101000001100111111101001001010110
10100000001100111110100011111010010110011010001110
0101000010111001001110111011100111010011100111110

-continued 10000001101000111010101100101110010110010010010101
11010011001100001101000111011110110010010101100101
0].

Figure 6:
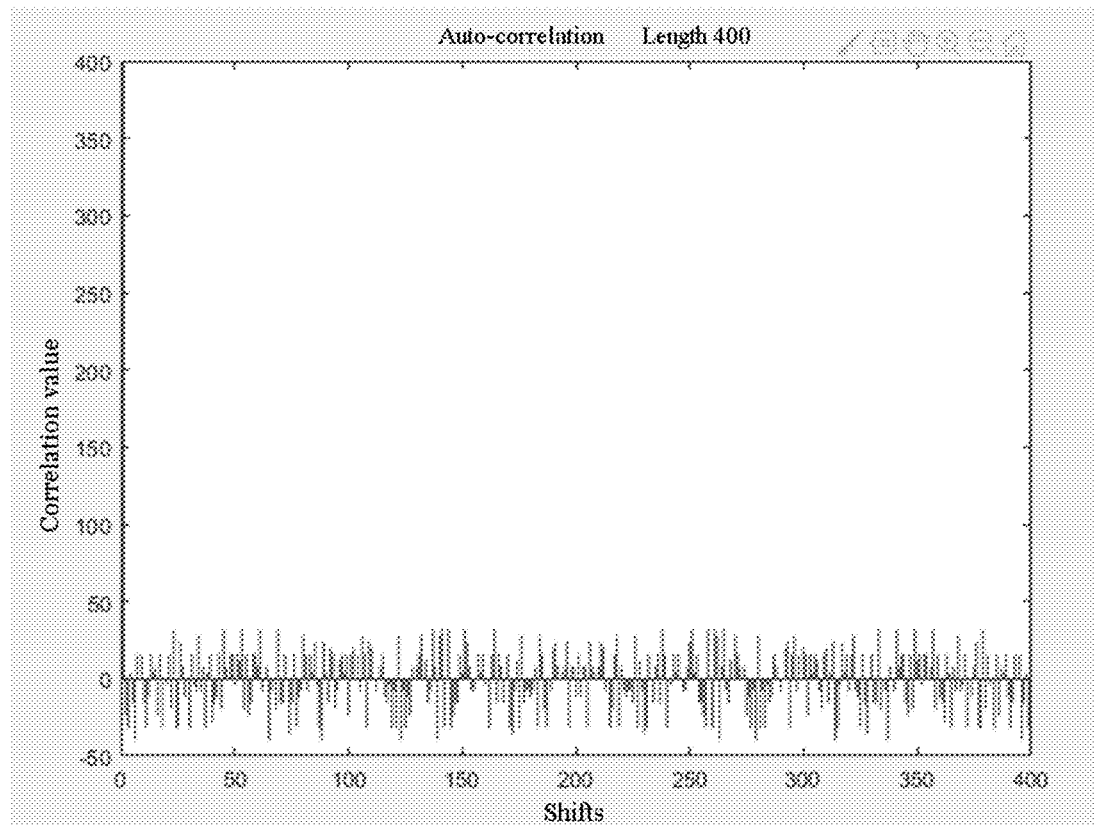
FIG. 6 is a schematic diagram showing auto-correlation values of a multiplicative group irreducible polynomial sequence 1 according to an embodiment of the disclosure.

FIG. 6 is a schematic diagram showing auto-correlation values of a multiplicative group irreducible polynomial sequence 1 according to an embodiment of the disclosure. Auto-correlation values of the sequence 1 are as shown in FIG. 6.

A sequence 2 generated based on a multiplicative group irreducible polynomial is:

[1001011000001101011101101101000100010110110111010
11000001101001011010110100011011011010100011001111
00100011110101000110001111110111010110011110001111
10101000010001101100110010001111110110000110000000
01001001010001001110011110010100000101001111001110
01000101001001000000001100001101111110001001100110
11000100001010111100011110011010110111110001100
0101011110001001111001100010101101101100010110101
0].

Figure 7:
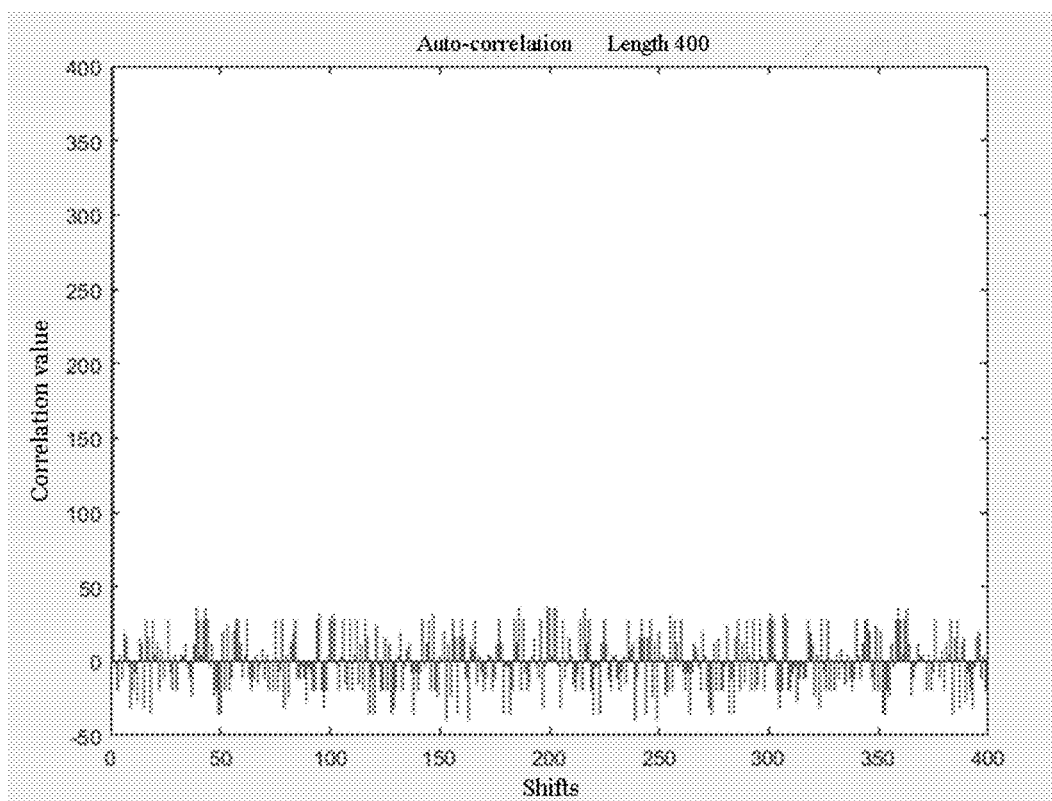
FIG. 7 is a schematic diagram showing auto-correlation values of a multiplicative group irreducible polynomial sequence 2 according to an embodiment of the disclosure.

FIG. 7 is a schematic diagram showing auto-correlation values of a multiplicative group irreducible polynomial sequence 2 according to an embodiment of the disclosure. Auto-correlation values of the sequence 2 are as shown in FIG. 7.

Figure 8:
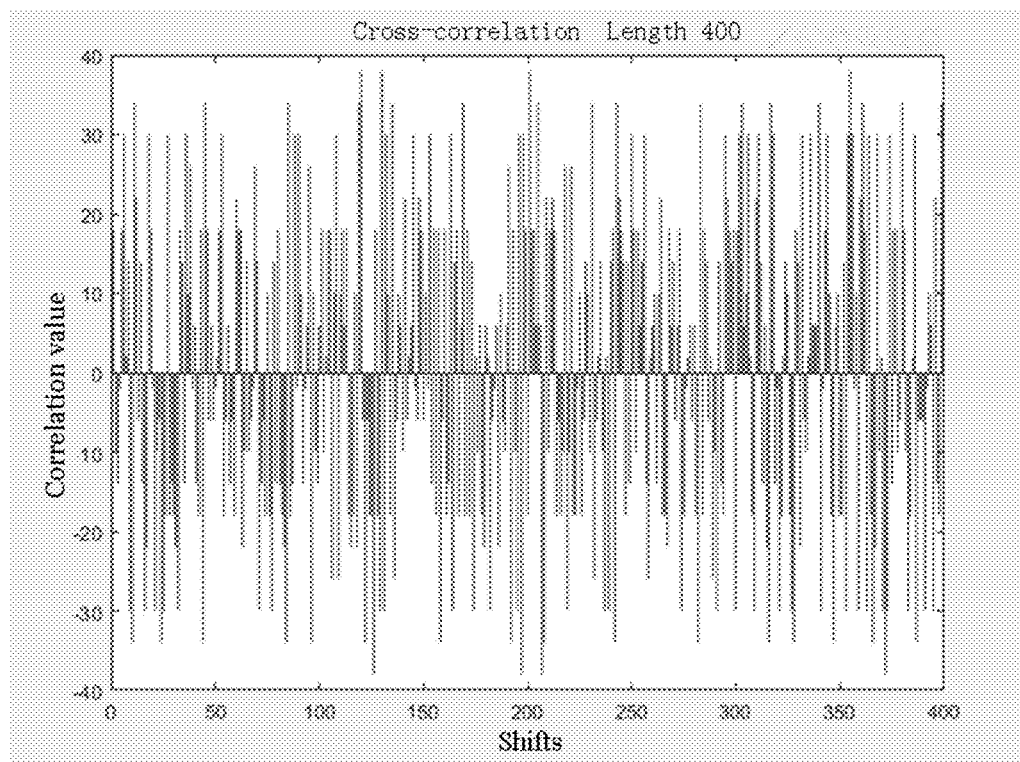
FIG. 8 is a schematic diagram showing cross-correlation values of a multiplicative group irreducible polynomial sequence according to an embodiment of the disclosure.

FIG. 8 is a schematic diagram showing cross-correlation values of a multiplicative group irreducible polynomial sequence according to an embodiment of the disclosure. Cross-correlation values of the sequences 1 and 2 generated based on multiplicative group irreducible polynomials are as shown in FIG. 8.

Data simulation results of $\mathcal{F}_1{'}$ are shown in table 2.

TABLE 2

| Prime number p | Sequence length | Sequence number | Correlation coefficient | Balance number |
|---|---|---|---|---|
| 31 | 30 | 15 | 10 | 8 |
| 67 | 66 | 33 | 18 | 17 |
| 127 | 126 | 63 | 22 | 32 |
| 257 | 256 | 128 | 32 | 64 |
| 521 | 520 | 260 | 44 | 130 |
| 1033 | 1032 | 516 | 64 | 258 |

Example 2

Based on an additive group structure of a prime characteristic finite field, a cyclic additive group is used to construct the sequence to obtain sequences of different lengths and better correlation coefficient characteristics. In order to obtain the cyclic addition group $F_q$, q is an odd prime.

Consider a monic polynomial set:

$$S_2 = \{x^2 + ax + b, a, b \in F_q\} \setminus \{(x-a)^2, a \in F_q\};$$

the number of sets $S_2$ is $q^2-q=q(q-1)$. The equivalence class in $S_2$ is defined as: $x^2+a_1x+b_1 \sim x^2+a_2x+b_2$, denoted as $[x^2+a_1x+b_1]$ if and only if there exists $\beta \in F_q$, $a_1=2\beta+a_2$, $b_1=\beta^2+\beta a+b_2$. There are exactly q elements in each equivalence class. As a result, there are exactly q−1 equivalence classes.

Select one polynomial in each equivalence class, and combine the selected polynomials with x to form a set $T_2$.

$$T_2 = \{x\} \cup \{x^2 + ax + b \in S_2, [x^2 + ax + b]$$

are equivalence classes distinct to each other}.

The method for generating the sequence cluster $\mathcal{F}_2$ includes:

for the polynomial f(x) in each $T_2$, defining:

$$u_f = \{\eta(f(0)), \eta(f(1)), \ldots, \eta(f(q-1))\};$$

and defining the sequence cluster as: $\mathcal{F}_2 = \{u_f, f(x) \in T_2\}$.

Parameters of this sequence are listed below:

1. each sequence in the binary periodic sequence cluster $\mathcal{F}_2$ has a length of q;
2. the sequence cluster $\mathcal{F}_2$ has a size of q; and
3. if $q \geq 17$ and is an odd prime power, a correlation coefficient upper limit of $\mathcal{F}_2$ is $\text{Cor}(\mathcal{F}_2) \leq 5 + \lfloor 2\sqrt{q} \rfloor$.

Data simulation results of $\mathcal{F}_2$ are shown in table 3.

TABLE 3

| Prime number p | Sequence length | Sequence number | Correlation coefficient | Balance number |
|---|---|---|---|---|
| 31 | 31 | 30 | 13 | 30 |
| 67 | 67 | 66 | 19 | 66 |
| 127 | 127 | 126 | 23 | 126 |
| 257 | 257 | 256 | 33 | 256 |
| 521 | 521 | 520 | 47 | 520 |
| 1033 | 1033 | 1032 | 65 | 1032 |

The above scheme only considers all quadratic polynomials, but leads to the loss of the correlation coefficient. In a preferred embodiment, quadratic irreducible polynomials in $S_t$ are considered to form a set denoted as $S_2{'}$.

$$S_2' = \{x^2 + ax + b, a, b \in F_q, x^2 + ax + b \text{ is an irreducible polynomial}\}.$$

Select one polynomial in each equivalence class of $S_2{'}$, and combine the selected polynomials with x to form a set $T_2{'}$:

$$T_2' = \{x\} \cup \{x^2 + ax + b \in S_2', [x^2 + ax + b]$$

are equivalence classes distinct to each other}

The method for generating the sequence cluster $\mathcal{F}_2{}'$ includes:

for the polynomial f(x) in each $T_2{}'$, defining:

$$u_f = \{\eta(f(0)), \eta(f(1)), \ldots, \eta(f(q-1))\};$$

and
defining the sequence cluster as:

$$\mathcal{F}_2' = \{u_f, f(x) \in T_2'\}.$$

Parameters of this sequence are listed below:
1. each sequence in the binary periodic sequence cluster $\mathcal{F}_2{}'$ has a length of q;
2. the sequence cluster $\mathcal{F}2$ has a size of (q−1)/2; and
3. if q≥7 and is an odd prime, a correlation coefficient upper limit of $\mathcal{F}_2{}'$ is $\text{Cor}(\mathcal{F}_4) \leq 1 + \lfloor 2\sqrt{q} \rfloor$.

For example, a sequence 1 generated based on an additive group irreducible polynomial is:

[0010001011000011110001000001010011000001001101
101100110110101101101111110111111000011111001011110
10010010000111000100010111110011111111100111110100
010001110000100100101111010011111000011111110111111
011011010110110011011011100100000011001010000000100
011110000101000100100010100100111000111111010001
00010101110110100000001100001111010001011110000110
00000010110111010100010001011111110001110010010100
01].

Figure 9:
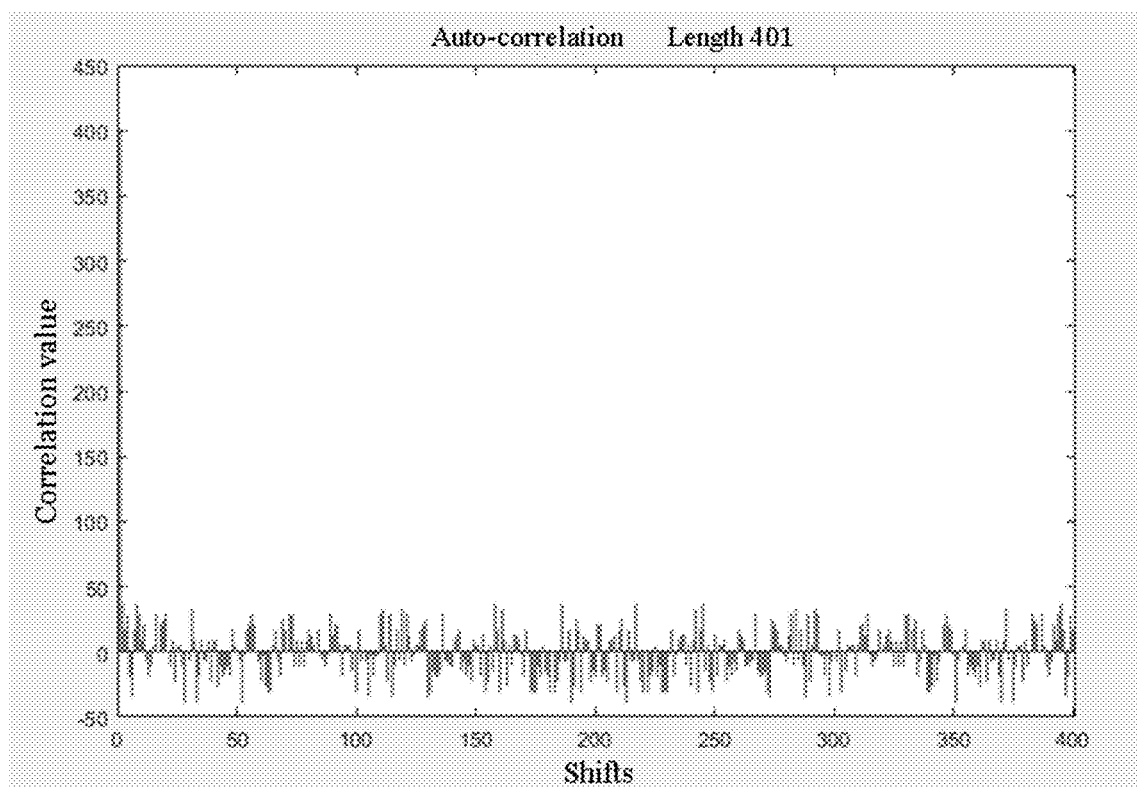
FIG. 9 is a schematic diagram showing auto-correlation values of an additive group irreducible polynomial sequence 1 according to an embodiment of the disclosure.

FIG. 9 is a schematic diagram showing auto-correlation values of an additive group irreducible polynomial sequence 1 according to an embodiment of the disclosure. Auto-correlation values of the sequence 1 generated based on an additive group irreducible polynomial are as shown in FIG. 9.

A sequence 2 generated based on an additive group irreducible polynomial is:

[1010010000111010100001011001000100010111100001110
011010111000001100101110111101110101001110010100000
1001010011011111111001011000011110110111100001101 0
01111111101100101001000010100111001010111011110111
0100110000011101011001110000111101000100010010100
000101011100001001010001001001101011110010101000010
011000100011100101110110010101111011111010100110
111010011110001000110010000010101001110101100100010
00].

Figure 10:
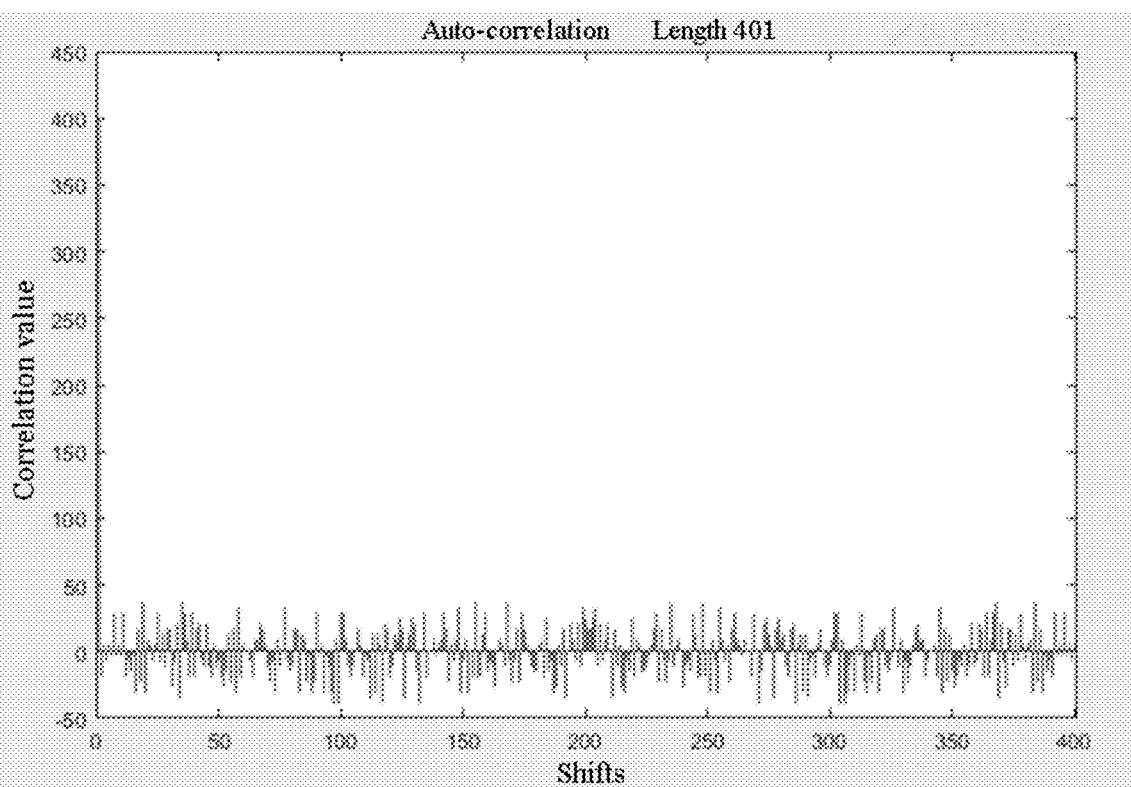
FIG. 10 is a schematic diagram showing auto-correlation values of an additive group irreducible polynomial sequence 2 according to an embodiment of the disclosure.

FIG. 10 is a schematic diagram showing auto-correlation values of an additive group irreducible polynomial sequence 2 according to an embodiment of the disclosure. Auto-correlation values of the sequence 2 generated based on an additive group irreducible polynomial are as shown in FIG. 10.

Figure 11:
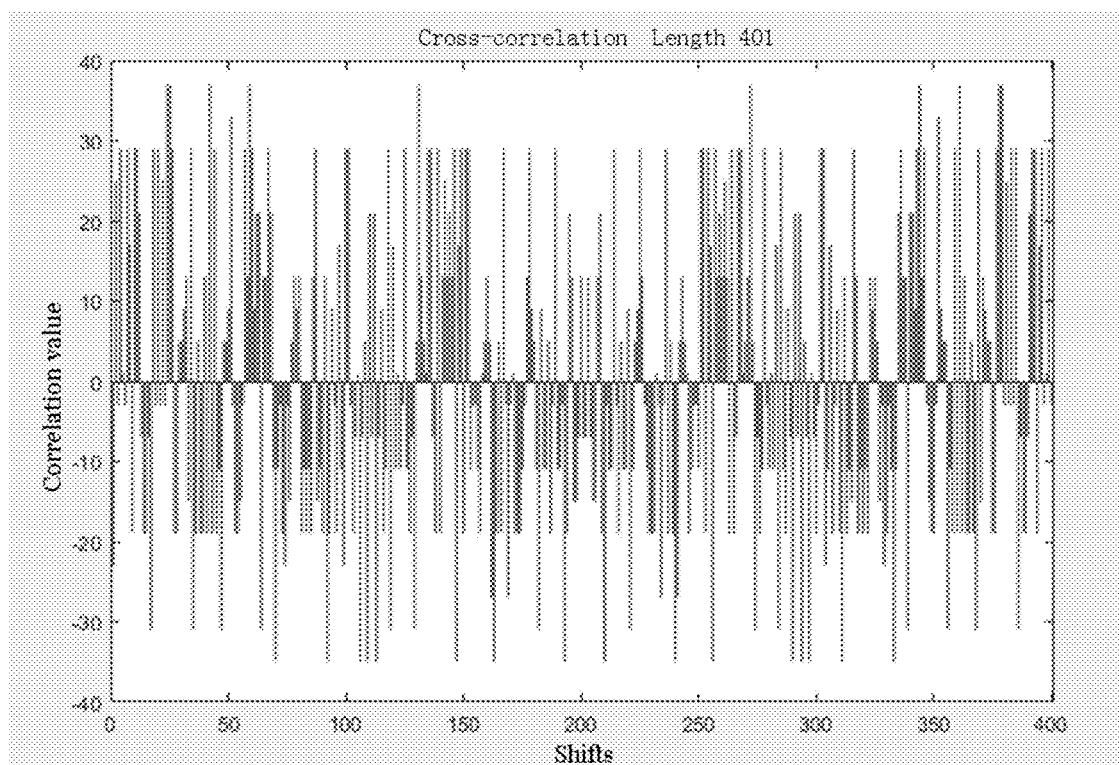
FIG. 11 is a schematic diagram showing cross-correlation values of an additive group irreducible polynomial sequence according to an embodiment of the disclosure.

FIG. 11 is a schematic diagram showing cross-correlation values of an additive group irreducible polynomial sequence according to an embodiment of the disclosure. Cross-correlation values of the sequences 1 and 2 generated based on additive group irreducible polynomial sequences are as shown in FIG. 11.

Data simulation results of $\mathcal{F}_2{}'$ are shown in table 4.

TABLE 4

| Prime number p | Sequence length | Sequence number | Correlation coefficient | Balance number |
|---|---|---|---|---|
| 31 | 31 | 15 | 9 | 15 |
| 67 | 67 | 33 | 17 | 33 |
| 127 | 127 | 63 | 21 | 63 |
| 257 | 257 | 128 | 31 | 128 |
| 521 | 521 | 260 | 43 | 260 |
| 1033 | 1033 | 516 | 63 | 516 |

Example 3

In a positioning signal generation environment in 5G, firstly, since the PRSID of LTE ranges from 0 to 4095, a slot number $n_s$ in each frame ranges from 0 to 20, and the number 1 of each OFDM symbol ranges from 0 to 6, there are 4096*20*7=573440 different combinations of these three parameters. Taking the closest prime q=573451 (closest to 573440) as the initial parameter, and generating a multiplicative group $F_{573451}{}^*$ is generated.

Figure 12:
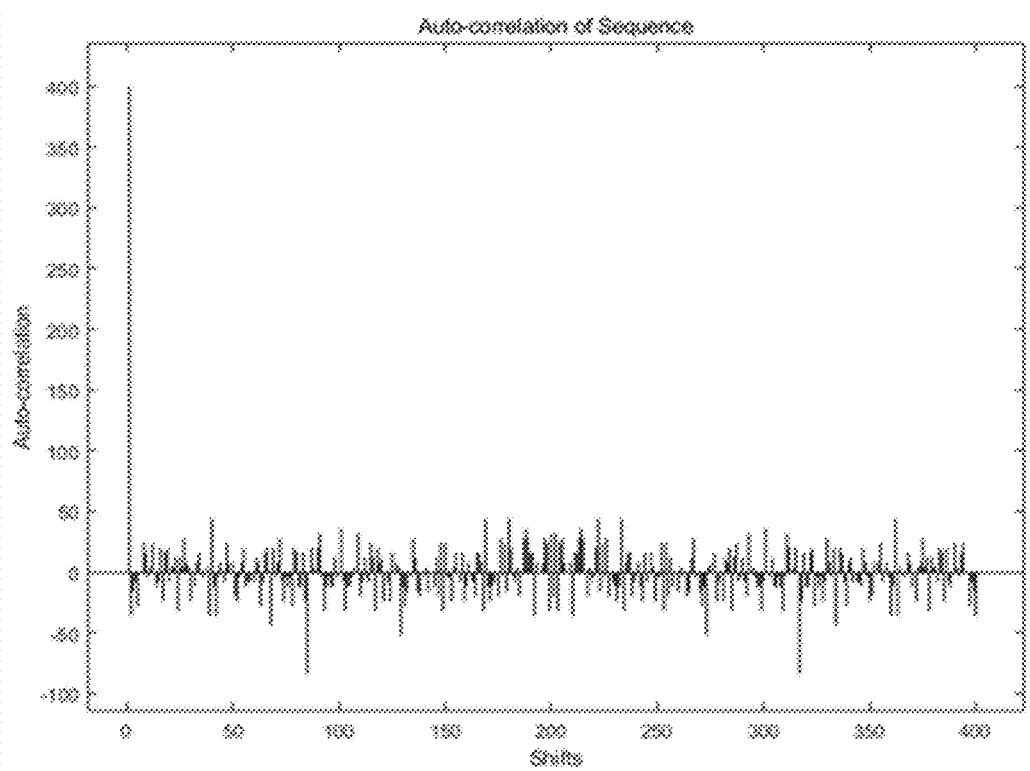
FIG. 12 is a schematic diagram showing auto-correlation values of a positioning reference signal generated according to an embodiment of the present disclosure.
Figure 13:
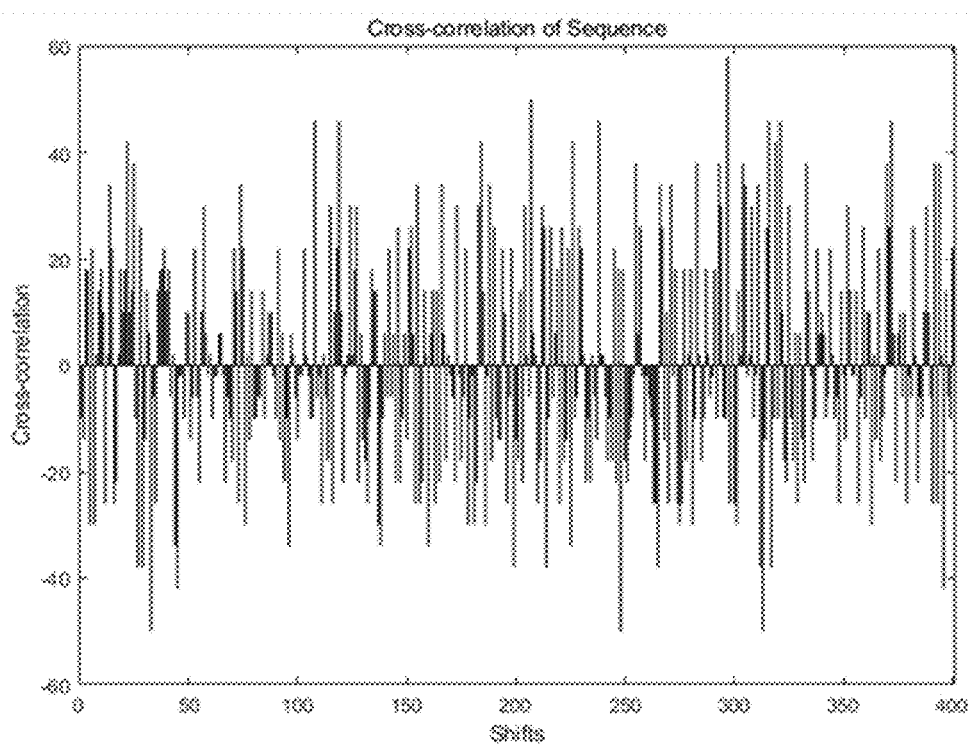
FIG. 13 is a schematic diagram showing cross-correlation values of two positioning reference signals generated according to an embodiment strip the present disclosure.

For selection of the positioning sequence in 5G, a finite field $F_{573451}$ for q=573451 is selected as the finite field used for generating the positioning sequence. FIG. 12 is a schematic diagram showing auto-correlation values of a positioning reference signal generated according to an embodiment of the present disclosure. Auto-correlation values of the generated positioning reference signal are as shown in FIG. 12. FIG. 13 is a schematic diagram showing cross-correlation values of two positioning reference signals generated according to an embodiment strip the present disclosure. Cross-correlation values of the two positioning reference signals are as shown in FIG. 13.

A method for truncating a 5G positioning sequence includes taking a truncated code with a length of 400, from bit 1600 to bit 2000 of the positioning sequence, as the positioning code, which is consistent with the 3GPP standard.

Secondly, according to the above sequence construction method, each polynomial $f(x) = x^2 + ax + b$ may determine a sequence cluster, in which only parameters a and b are included. Three parameters are mapped to LTE according to different combinations of a and b, which specifically includes:

$$\begin{cases} a = 1 \\ b = 180 \cdot N_{ID}^{PRS} + 100 \cdot \lfloor n_s/10 \rfloor + 10 \cdot 1 + (n_s \bmod 10) \end{cases},$$

where $N_{ID}^{PRS}$ the positioning reference signal (PRS) ID, 1 is an OFDM symbol number in a slot, and $n_s$ is a slot number within a frame.

According to the 3GPP standard, different $C_{init}$ are randomly generated to generate the Gold sequence, and 400 bits after bit 1600 are truncated. The same random parameters and the same truncation method are used to generate the sequence in the embodiment of the present disclosure and a Kasami sequence. Parts of the three sequences are selected for comparison. The comparison results are shown in table 5.

TABLE 5

|  | Gold sequence | Kasami | Binary periodic sequence in embodiments of the present disclosure |
|---|---|---|---|
| Average auto-correlation | 59.55 | 59.52 | 59.18 |
| Maximum auto-correlation | 104 | 104 | 100 |
| Average cross-correlation | 63.384386 | 63.351228 | 63.296617 |
| Maximum cross-correlation | 126 | 118 | 116 |

The positioning process is described below.

After the transmitting end generates a positioning code, the positioning code is modulated according to the 3GPP signal modulation scheme to generate a positioning signal. Then, the positioning signal is mapped to a transmitting antenna port for transmission according to the 3GPP resource grid mapping scheme. After receiving the signal, the receiving end performs cross-correlation to obtain an arrival time of the signal and thus a distance to the signal transmitting end, so as to select an appropriate algorithm for positioning.

Through the description of the above implementations, those skilled in the art can clearly understand that the method according to the above embodiment may be implemented by means of software plus a necessary general hardware platform. Obviously, it may also be implemented by hardware, but in most cases, the former is preferred. Based on such understanding, the technical solutions of the present invention essentially or, in other words, a part thereof contributing to the prior art, can be embodied in a form of a software product, wherein the software product is stored in a storage medium (such as an ROM/RAM, a disk, or an optical disc) and includes a number of instructions to make a terminal device (which may be a mobile phone, a computer, a server, or a network device, etc.) to execute the methods of the various embodiments of the present disclosure.

Embodiment 2

This embodiment further provides a positioning and transmission apparatus based on a binary periodic sequence, which is configured to implement the above embodiments and preferred implementations. Details which have been explained will not be repeated here. As used herein, the term "module" may be a combination of software and/or hardware that can realize a preset function. The apparatus described in the following embodiments is preferably implemented in software, but hardware, or a combination of software and hardware, is also possible and contemplated.

Figure 14:
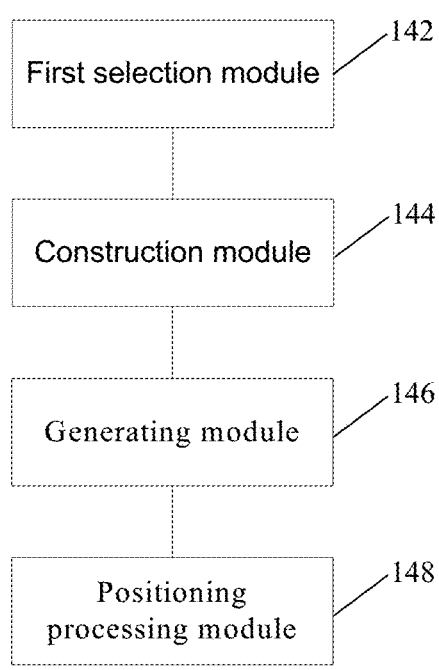
FIG. 14 is a block diagram of a positioning apparatus based on a binary periodic sequence according to an embodiment of the present disclosure.

FIG. 14 is a block diagram of a positioning apparatus based on a binary periodic sequence according to an embodiment of the present disclosure. As shown in FIG. 14, the positioning apparatus includes:

a first selection module 142 configured to select one polynomial from each equivalence class of a quadratic polynomial set S to determine a set T;

a construction module 144 configured to construct a binary periodic sequence cluster according to the set T;

a generating module 146 configured to generate a positioning signal according to the binary periodic sequence cluster; and a positioning processing module 148 configured to perform positioning processing according to the positioning signal.

Optionally, the generating module 146 includes:

a selecting unit configured to select a positioning sequence from the binary periodic sequence cluster according to a preset parameter;

a determining unit configured to take a truncated sequence with a preset length from the positioning sequence and determining the truncated sequence as a positioning reference sequence; and a generating unit configured to generate the positioning signal by modulating the positioning reference sequence.

Optionally, the positioning processing module 148 includes:

a transmitting unit configured to map the positioning signal to an antenna port at a transmitting end for transmission. The positioning signal is configured to instruct a receiving end, after receiving the positioning signal, to: perform cross-correlation to obtain an arrival time of the positioning signal, determine a distance from a transmitting end according to the arrival time, and perform positioning according to the distance.

The transmitting end may be the positioning apparatus itself, or may include the positioning apparatus or be independent of the positioning device. The receiving end may form a positioning system with the positioning device.

Optionally, the positioning apparatus further includes:

a second selection module configured to select one generator $\gamma$ from $F_q^*$, where $F_q$ is a finite field containing q elements, q is an odd prime or an odd prime power, and $F_q^*$ is a set of all nonzero elements in $F_q$.

Optionally, the first selection module 142 is further configured to select one polynomial f(x) from each equivalence class of a quadratic polynomial set $S_1$ and combine the polynomial f(x) with x−1 to form a set $T_1$ by:

$$T_1 = \{x - 1\} \cup \{x^2 + ax + b \in S_1, [x^2 + ax + b]$$

are equivalence classes distinct to each other}, where $$S_1 = \{x^2 + ax + b, a \in F_q^*, b \in F_q\} \setminus \{(x-a)^2, a \in F_q^*\}.$$

Optionally, the construction module 144 is further configured to construct a binary periodic sequence cluster $\mathcal{F}_1$ from the generator $\gamma$ and the set $T_1$:

$$F\_1 = \left\{ s\_f, \mathcal{F}_1 = \{s_f, f(x) \in T_1\}; \right.$$

$$s_f = \{\eta(f(1)), \eta(f(\gamma)), \ldots, \eta(f(\gamma^{q-2}))\};$$

$$\eta(a) = \begin{cases} 1, & \text{if } a \text{ is a nonzero square} \\ -1, & \text{if } a \text{ is a non-square} \\ 0, & \text{if } a = 0 \end{cases}$$

where η is a quadratic multiplicative character from $F_q$ to $C^*$, C is a complex number set excluding 0, and α is any element in $F_q^*$.

Optionally, each sequence in the binary periodic sequence cluster $\mathcal{F}_1$ has a length of q−1;

the binary periodic sequence cluster $\mathcal{F}_1$ has a size of q; and if q≥17 and is an odd prime power, a correlation upper limit of the binary periodic sequence cluster $\mathcal{F}_1$ is $Cor(\mathcal{F}_1) \leq 6 + \lfloor 2\sqrt{q} \rfloor$.

Optionally, the first selection module 142 is further configured to, in the case where $x^2+ax+b$ in $S_1$ is an irreducible polynomial, $$S_1' = \{x^2 + ax + b, a \in F_q^*, b \in F_q, x^2 + ax + b \text{ is an irreducible polynomial}\};$$

select one polynomial f(x) from each equivalence class of a quadratic polynomial set $S_1'$ and combining the polynomial f(x) with x−1 to form a set $T_1'$:

$$T_1' = \{x-1\} \cup \{x^2 + ax + b. \in S_1', [x^2 + ax + b]$$

are equivalence classes distinct to each other}.

Optionally, the construction module 144 is further configured to construct a binary periodic sequence cluster $\mathcal{F}_1'$ from the generator γ and the set $T_1'$:

$$\mathcal{F}_1' = \{s_f, f(x) \in T_1'\};$$

$$s_f = \{\eta(f(1)), \eta(f(\gamma)), \ldots, \eta(f(\gamma^{q-2}))\};$$

$$\eta(a) = \begin{cases} 1, & \text{if } a \text{ is a nonzero square} \\ -1, & \text{if } a \text{ is a non-square} \\ 0, & \text{if } a = 0 \end{cases}$$

where η is a quadratic multiplicative character from $F_q$ to $C^*$, C is a complex number set excluding 0, and α is any element in $F_q^*$.

Optionally, each sequence in the binary periodic sequence cluster $\mathcal{F}_1'$ has a length of q−1;

the binary periodic sequence cluster $\mathcal{F}_1'$ has a size of ½(q−1); and if q≥11 and is an odd prime power, a correlation coefficient upper limit of the binary periodic sequence cluster $\mathcal{F}_1'$ is $Cor(\mathcal{F}_1') \leq 2 + \lfloor 2\sqrt{q} \rfloor$.

Optionally, the positioning apparatus further includes:

a first dividing module configured to perform equivalence class division on the polynomials in the quadratic polynomial set S, and determine, if and only if there exists $\beta \in F_q^*$ such that $a_1 = \beta a_2, b_1 = \beta^2 b_2$, an equivalence relation between $x^2 + a_1 x + b_1$ and $x^2 + a_2 x + b_2$, and determining an equivalence class of the quadratic polynomial set S to be $[x^2 + a_i x + b_i]$.

Optionally, the first selection module 142 is further configured to select one polynomial f(x) from each equivalence class of a quadratic polynomial set $S_2$ and combine the polynomial f(x) with x to form a set $T_2$:

$$T_2 = \{x\} \cup \{x^2 + ax + b \in S_2, [x^2 + ax + b] \text{ are equivalence classes distinct to each other}\};$$

$S_2 = \{x^2 + ax+b, a,b \in F_q\} \setminus \{(x-a)^2, a \in F_q\}$, where $F_q$ is a finite field containing q elements, and q is an odd prime.

Optionally, the construction module 144 is further configured to construct a binary periodic sequence cluster $\mathcal{F}_2$ from the set $T_2$:

$$\mathcal{F}_2 = \{u_f, f(x) \in T_2\};$$

$$u_f = \{\eta(f(0)), \eta(f(1)), \ldots, \eta(f(q-1))\};$$

$$\eta(a) = \begin{cases} 1, & \text{if } a \text{ is a nonzero square} \\ -1, & \text{if } a \text{ is a non-square} \\ 0, & \text{if } a = 0 \end{cases}$$

where η is a quadratic multiplicative character from $F_q$ to $C^*$, C is a complex number set excluding 0, and a is any element in $F_q^*$.

Optionally, each sequence in the binary periodic sequence cluster $\mathcal{F}_2$ has a length of q;

the binary periodic sequence cluster $\mathcal{F}_2$ has a size of q; and if q≥17 and is an odd prime, a correlation coefficient upper limit of the binary periodic sequence cluster $\mathcal{F}_2$ is $Cor(\mathcal{F}_2) \leq 5 + \lfloor 2\sqrt{q} \rfloor$.

Optionally, the first selection module 142 is further configured to, in the case where the $x^2+ax+b$ in $S_2$ is an irreducible polynomial, $$S_2' = \{x^2 + ax + b, a, b \in F_q, x^2 + ax + b \text{ is an irreducible polynomial}\};$$

select one polynomial f(x) from each equivalence class of a quadratic polynomial set $S_2'$ and combine the polynomial f(x) with x to form a set $T_2'$:

$$T_2' = \{x\} \cup \{x^2 + ax + b \in S_2', [x^2 + ax + b]$$

are equivalence classes distinct to each other}.

Optionally, the construction module is further configured to a binary periodic sequence cluster $\mathcal{F}_2'$ from the set $T_2$:

$$\mathcal{F}_2' = \{u_f, f(x) \in T_2'\};$$

$$u_f = \{\eta(f(0)), \eta(f(\gamma)), \ldots, \eta(f(q-1))\};$$

$$\eta(a) = \begin{cases} 1, & \text{if } a \text{ is a nonzero square} \\ -1, & \text{if } a \text{ is a non-square} \\ 0, & \text{if } a = 0 \end{cases}$$

where η is a quadratic multiplicative character from $F_q$ to $C^*$, C is a complex number set excluding 0, and a is any element in $F_q^*$.

Optionally, each sequence in the binary periodic sequence cluster $\mathcal{F}_2'$ has a length of q;

the binary periodic sequence cluster $\mathcal{F}_2'$ has a size of (q−1)/2; and if $q \geq 7$ and is an odd prime, a correlation coefficient upper limit of the binary periodic sequence cluster $\mathcal{F}_2'$ is $\text{Cor}(\mathcal{F}_4) \leq 1 + \lfloor 2\sqrt{q} \rfloor$.

Optionally, the positioning apparatus further includes:

a second dividing module configured to perform before the first selection module 142 selects the polynomial from each equivalence class of a quadratic polynomial set S to determine a set T, equivalence class division on the polynomials in the quadratic polynomial set S. The division operation includes:

the second dividing module determining, if and only if there exists $\beta \in F_q$, $a_1 = 2\beta + a_2$, $b_1 = \beta^2 + \beta a + b_2$, an equivalence relation between $x^2 + a_1 x + b_1$ and $x^2 + a_2 x + b_2$, and determining an equivalence class of the quadratic polynomial set S to be $[x^2 + a_1 x + b_1]$.

It should be noted that each of the above modules may be implemented by software or hardware. For the latter, it may be implemented by, but are not limited to: the above modules all located in the same processor; or the above modules each located in different processors in any combination.

Embodiment 3

An embodiment of the disclosure further provides a storage medium having a computer program stored thereon, which computer program is configured to be executed to cause steps of any one of the above method embodiments to be implemented.

Optionally, in this embodiment, the storage medium may be configured to store a computer program for implementing the steps of:

S11, selecting one polynomial from each equivalence class of a quadratic polynomial set S to determine a set T;

S12, constructing a binary periodic sequence cluster according to the set T;

S13, generating a positioning signal according to the binary periodic sequence cluster; and S14, performing positioning processing according to the positioning signal.

Optionally, in this embodiment, the storage medium may include, but is not limited to: a U disk, a read-only memory (ROM), a random access memory (RAM), a mobile hard disk, a disk or optical disk, and other media that can store a computer program.

Embodiment 4

An embodiment of the disclosure further provides an electronic apparatus, including a memory having a computer program stored thereon and a processor configured to execute the computer program to perform steps of any one of the above method embodiments.

Optionally, the electronic apparatus may further include a transmission device and an input/output device. The transmission device is coupled to the processor, and the input/output device is coupled to the processor.

Optionally, in this embodiment, the processor may be configured to execute the following steps via the computer program:

S11, selecting one polynomial from each equivalence class of a quadratic polynomial set S to determine a set T;

S12, constructing a binary periodic sequence cluster according to the set T;

S13, generating a positioning signal according to the binary periodic sequence cluster; and S14, performing positioning processing according to the positioning signal.

Optionally, specific examples in the present embodiment may refer to the examples described in the foregoing embodiments and alternative implementations, which will not be repeated in the present embodiment.

Obviously, a person skilled in the art would understand that the above modules and steps of the present disclosure can be realized by using a universal computing device, can be integrated in a single computing device or distributed on a network that consists of a plurality of computing devices; and alternatively, they can be realized by using the executable program code of the computing device, so that they can be stored in a storage device and executed by the computing device, in some cases, can perform the shown or described steps in a sequence other than herein, or they are made into various integrated circuit modules respectively, or a plurality of modules or steps thereof are made into a single integrated circuit module, thus to be realized. In this way, the present disclosure is not restricted to any particular hardware and software combination.

The descriptions above are only preferred embodiments of the present disclosure, which are not used to restrict the present disclosure. For those skilled in the art, the present disclosure may have various changes and variations. Any amendments, equivalent substitutions, improvements, etc. within the principle of the disclosure are all included in the scope of the protection defined by the appended claims of the disclosure.

What is claimed is:

1. A positioning method based on a binary periodic sequence, comprising the steps of:
   selecting one polynomial from each equivalence class of a quadratic polynomial set S to determine a set T;
   constructing a binary periodic sequence cluster according to the set T;
   generating a positioning signal according to the binary periodic sequence cluster; and
   performing positioning processing according to the positioning signal.

2. The method according to claim 1, wherein the step of generating the positioning signal according to the binary periodic sequence cluster comprises:
   selecting a positioning sequence from the binary periodic sequence cluster according to a preset parameter;
   taking a truncated sequence with a preset length from the positioning sequence and determining the truncated sequence as a positioning reference sequence; and
   generating the positioning signal by modulating the positioning reference sequence.

3. The method according to claim 1, wherein the step of performing positioning processing according to the positioning signal comprises:
   mapping the positioning signal to an antenna port at a transmitting end for transmission, wherein the positioning signal is configured to instruct a receiving end, after receiving the positioning signal, to: perform cross-correlation to obtain an arrival time of the positioning signal, determine a distance from the transmitting end according to the arrival time, and perform positioning according to the distance.

4. The method according to claim 1, wherein before selecting one polynomial from each equivalence class of the quadratic polynomial set S to determine the set T, the method further comprises:

selecting one generator $\gamma$ from $F_q^*$, where $F_q$ is a finite field containing q elements, q is an odd prime or an odd prime power, and $F_q^*$ is a set of all nonzero elements in $F_q$.

5. The method according to claim 4, wherein the step of selecting one polynomial from each equivalence class of the quadratic polynomial set S to determine the set T comprises:

selecting one polynomial f(x) from each equivalence class of a quadratic polynomial set $S_1$ and combining the polynomial f(x) with x−1 to form a set $T_1$ in the following manner:

$$T_1 = \{x-1\} \cup \{x^2+ax+b \in S_1, [x^2+ax+b]$$

are equivalence classes distinct to each other};

where $S_1 = \{x^2+ax+b, a \in F_q^*, b \in F_q\} \setminus \{(x-a)^2, a \in F_q^*\}$.

6. The method according to claim 5, wherein the step of constructing the binary periodic sequence cluster according to the set T comprises:

constructing a binary periodic sequence cluster $\mathcal{F}_1$ from the generator $\gamma$ and the set $T_1$ in the following manner:

$$\mathcal{F}_1 = \{s_f, f(x) \in T_1\};$$

$$s_f = \{\eta(f(1)), \eta(f(\gamma)), \ldots, \eta(f(\gamma^{q-2}))\};$$

$$\eta(\alpha) = \begin{cases} 1, & \text{if } \alpha \text{ is a nonzero square} \\ -1, & \text{if } \alpha \text{ is a non-square} \\ 0, & \text{if } \alpha = 0 \end{cases}$$

where $\eta$ is a quadratic multiplicative character from $F_q$ to $C^*$, C is a complex number set excluding 0, and $\alpha$ is any element in $F_q^*$.

7. The method according to claim 6, wherein each sequence in the binary periodic sequence cluster $\mathcal{F}_1$ has a length of q−1;

the binary periodic sequence cluster $\mathcal{F}_1$ has a size of q; and if q≥17 and is an odd prime power, a correlation upper limit of the binary periodic sequence cluster $\mathcal{F}_1$ is $\text{Cor}(\mathcal{F}_1) \leq 6 + \lfloor 2\sqrt{q} \rfloor$.

8. The method according to claim 5, wherein before selecting one polynomial from each equivalence class of the quadratic polynomial set S to determine the set T, the method further comprises:

performing equivalence class division on the polynomials in the quadratic polynomial set S, comprising:

determining, if and only if there exists $\beta \in F_q^*$ such that $a_1 = \beta a_2$, $b_1 = \beta^2 b_2$, an equivalence relation between $x^2+a_1x+b_1$ and $x^2+a_2x+b_2$, and determining an equivalence class of the quadratic polynomial set S to be $[x^2+a_1x+b_1]$.

9. The method according to claim 4, wherein the step of selecting one polynomial from each equivalence class of the quadratic polynomial set S to determine the set T comprises:

in a case where $x^2+ax+b$ in $S_1$ is an irreducible polynomial, $$S_1' = \{x^2+ax+b, a \in F_q^*, b \in F_q, x^2+ax+b$$

is an irreducible polynomial};

selecting one polynomial f(x) from each equivalence class of a quadratic polynomial set $S_1'$ and combining the polynomial f(x) with x−1 to form a set $T_1'$ in the following manner:

$$T_1' = \{x-1\} \cup \{x^2+ax+b, \in S_1^i, [x^2+ax+b]$$

are equivalence classes distinct to each other}.

10. The method according to claim 9, wherein the step of constructing the binary periodic sequence cluster according to the set T comprises:

constructing a binary periodic sequence cluster $\mathcal{F}_1'$; from the generator y and the set $T_1'$ in the following manner:

$$\mathcal{F}_1' = \{s_f, f(x) \in T_1'\};$$

$$s_f = \{\eta(f(1)), \eta(f(\gamma)), \ldots, \eta(f(\gamma^{q-2}))\};$$

$$\eta(\alpha) = \begin{cases} 1, & \text{if } \alpha \text{ is a nonzero square} \\ -1, & \text{if } \alpha \text{ is a non-square} \\ 0, & \text{if } \alpha = 0 \end{cases}$$

where $\eta$ is a quadratic multiplicative character from $F_q$ to $C^*$, C is a complex number set excluding 0, and $\alpha$ is any element in $F_q^*$.

11. The method according to claim 10, wherein each sequence in the binary periodic sequence cluster $\mathcal{F}_1'$ has a length of q−1;

the binary periodic sequence cluster $\mathcal{F}_1'$; has a size of ½(q−1); and if q≥11 and is an odd prime power, a correlation coefficient upper limit of the binary periodic sequence cluster $\mathcal{F}_1'$ is $\text{Cor}(\mathcal{F}_1) \leq 2 + \lfloor 2\sqrt{q} \rfloor$.

12. The method according to claim 1, wherein the step of selecting one polynomial from each equivalence class of the quadratic polynomial set S to determine the set T comprises:

selecting one polynomial f(x) from each equivalence class of a quadratic polynomial set $S_2$ and combining the polynomial f(x) with x to form a set $T_2$:

$$T_2 = \{x\} \cup \{x^2+ax+b \in S_2, [x^2+ax+b]$$

are equivalence classes distinct to each other};

$$S_2 = \{x^2 ax+b, a,b \in F_q\} \setminus \{(x-a)^2, a \in F_q\},$$

where $F_q$ is a finite field containing q elements, and q is an odd prime.

13. The method according to claim 12, wherein the step of constructing the binary periodic sequence cluster according to the set T comprises:

constructing a binary periodic sequence cluster $\mathcal{F}_1$ from the set $T_2$:

$$\mathcal{F}_2 = \{u_f, f(x) \in T_2\};$$

$$u_f = \{\eta(f(0)), \eta(f(1)), \ldots, \eta(f(q-1))\};$$

$$\eta(\alpha) = \begin{cases} 1, & \text{if } \alpha \text{ is a nonzero square} \\ -1, & \text{if } \alpha \text{ is a non-square} \\ 0, & \text{if } \alpha = 0 \end{cases}$$

where η is a quadratic multiplicative character from $F_q$ to $C^*$, C is a complex number set excluding 0, and α is any element in $F_q^*$.

14. The method according to claim 13, wherein
each sequence in the binary periodic sequence cluster $\mathcal{F}_1$ has a length of q;
the binary periodic sequence cluster $\mathcal{F}_1$ has a size of q; and
if q≥17 and is an odd prime, a correlation coefficient upper limit of the binary periodic sequence cluster $\mathcal{F}_1$ is $\mathrm{Cor}(F_2) \leq 5 + \lfloor 2\sqrt{q} \rfloor$.

15. The method according to claim 13, wherein before selecting one polynomial from each equivalence class of the quadratic polynomial set S to determine the set T, the method further comprises:
performing equivalence class division on the polynomials in the quadratic polynomial set S, comprising:
determining, if and only if there exists $\beta \in F_q$, $a_1 = 2\beta + a_2$, $b_1 = \beta^2 + \beta a + b_2$, an equivalence relation between $x^2 + a_1 x + b_1$ and $x^2 + a_2 x + b_2$, and determining an equivalence class of the quadratic polynomial set S to be $[x^2 + a_1 x + b_1]$.

16. The method according to claim 12, wherein the step of selecting one polynomial from each equivalence class of the quadratic polynomial set S to determine the set T comprises:
in the case where the $x^2 + ax + b$ in $S_2$ is an irreducible polynomial, $$S_2' = \{x^2 + ax + b, a, b \in F_q, x^2 + ax + b \text{ is an irreducible polynomial}\};$$

selecting one polynomial f(x) from each equivalence class of a quadratic polynomial set $S_2'$ and combining the polynomial f(x) with x to form a set $T_2'$:

$$T_2' = \{x\} \cup \{x^2 + ax + b \in S_2'[x^2 + ax + b]$$

are equivalence classes distinct to each other}.

17. The method according to claim 16, wherein the step of constructing the binary periodic sequence cluster according to the set T comprises:
constructing a binary periodic sequence cluster $\mathcal{F}_1'$ from the set $T_2$ in the following manner:

$$\mathcal{F}_2' = \{u_f, f(x) \in T_2'\};$$

$$u_f = \{\eta(f(0)), \eta(f(1)), \ldots, \eta(f(q-1))\};$$

$$\eta(\alpha) = \begin{cases} 1, & \text{if } \alpha \text{ is a nonzero square} \\ -1, & \text{if } \alpha \text{ is a non-square} \\ 0, & \text{if } \alpha = 0 \end{cases}$$

where η is a quadratic multiplicative character from $F_q$ to $C^*$, C is a complex number set excluding 0, and α is any element in $F_q^*$.

18. The method according to claim 17, wherein
each sequence in the binary periodic sequence cluster $\mathcal{F}_1'$ has a length of q;
the binary periodic sequence cluster $\mathcal{F}_1'$ has a size of (q−1)/2; and
if q≥7 and is an odd prime, a correlation coefficient upper limit of the binary periodic sequence cluster $\mathcal{F}_1'$ is $\mathrm{Cor}(\mathcal{F}_4) \leq 1 + \lfloor 2\sqrt{q} \rfloor$.

19. A non-transitory computer-readable storage medium having a computer program stored thereon, wherein the computer program is configured to be executed to cause the method of claim 1 to be implemented.

20. An electronic apparatus, comprising a memory and a processor, wherein the memory has a computer program stored thereon, and the processor is configured to execute the computer program to implement the method of claim 1.

* * * * *

UNITED STATES PATENT AND TRADEMARK OFFICE
CERTIFICATE OF CORRECTION

PATENT NO. : 11,902,933 B2
APPLICATION NO. : 17/611135
DATED : February 13, 2024
INVENTOR(S) : Weiliang Zhang, et al.

It is certified that error appears in the above-identified patent and that said Letters Patent is hereby corrected as shown below:

In the Specification

Column 8, Line 7, the formula reading:

$Cor(\mathcal{F}_4) \leq 1 + \lfloor 2\sqrt{q} \rfloor$

Should read:

$Cor(\mathcal{F}_2') \leq 1 + \lfloor 2\sqrt{q} \rfloor$

Column 12, Line 27, the formula reading:

--$\mathcal{F}_2 = \{u_f f(x) \in T_2\}$--

Should read:

--$\mathcal{F}_2 = \{u_f, f(x) \in T_2\}$--

Column 13, Line 20, the parameter reading:

$\mathcal{F}_2$

Should read:

--$\mathcal{F}_2'$--

Column 17, Line 62, the formula reading:

--$x^2 + a_i x + b_1$--

Should read:

--$x^2 + a_1 x + b_1$--

Signed and Sealed this
Fourth Day of June, 2024

*Katherine Kelly Vidal*

Katherine Kelly Vidal
*Director of the United States Patent and Trademark Office*

Column 17, Line 63, the formula reading:

$$[x^2 + a_i x + b_i]$$

Should read:
--[x² + a₁x + b₁]--

Column 18, Line 6, the formula reading:
-x² ax+b.-
Should read:
--$x^2 + ax + b$--

In the Claims

Column 22, Line 16, the parameter reading:

$$S_1^i$$

Should read:
--$S'_1$--

Column 22, Line 45, the parameter reading:
-$\mathcal{F}_1$-
Should read:
--$\mathcal{F}'_1$--

Column 22, Line 60, the formula reading:
-x² ax+b,-
Should read:
--$x^2 + ax + b$--

Column 22, Line 66, the parameter reading:
-$\mathcal{F}_1$-
Should read:
--$\mathcal{F}_2$--

Column 23, Line 1, the formula reading:
-$\mathcal{F}_2 - \{u_f, f(x) \in T_2\}|$-
Should read:
--$\mathcal{F}_2 = \{u_f, f(x) \in T_2\}$--

Column 23, Line 14, the parameter reading:
-$\mathcal{F}_1$-
Should read:
--$\mathcal{F}_2$--

CERTIFICATE OF CORRECTION (continued)
U.S. Pat. No. 11,902,933 B2

Column 23, Line 16, the parameter reading:
-$\mathcal{F}_1$-
Should read:
--$\mathcal{F}_2$--

Column 23, Line 20, the parameter reading:
-$\mathcal{F}_1$-
Should read:
--$\mathcal{F}_2$--

Column 24, Line 6, the formula reading:
-$T'_2 = \{x\} \cup \{x^2 + ax + b \in S'_2 [x^2 + ax + b]$
are equivalence classes distinct to each other\}.-
Should read:
--$T'_2 = \{x\} \cup \{x^2 + ax + b \in S'_2, [x^2 + ax + b]$are equivalence classes distinct to each other\}--

Column 24, Line 13, the parameter reading:
-$\mathcal{F}_1'$-
Should read:
--$\mathcal{F}_2'$--

Column 24, Line 19, the formula reading:
-$u_f - \{\eta(f(0)), \eta(f(1)), \ldots, \eta(f(q-1))\}$-
Should read:
--$u_f = \{\eta(f(0)), \eta(f(1)), \ldots, \eta(f(q-1))\}$--

Column 24, Line 29, the parameter reading:
-$\mathcal{F}_1'$-
Should read:
--$\mathcal{F}_2'$--

Column 24, Line 31, the parameter reading:
-$\mathcal{F}_1'$-
Should read:
--$\mathcal{F}_2'$--

Column 24, Line 34, the parameter reading:
-$\mathcal{F}_1'$-
Should read:
--$\mathcal{F}_2'$--

CERTIFICATE OF CORRECTION (continued)
U.S. Pat. No. 11,902,933 B2

Column 24, Line 35, the parameter reading:
-$\mathcal{F}_4$-

Should read:
--$\mathcal{F}_2'$--